US009979930B2

United States Patent
Yang et al.

(10) Patent No.: US 9,979,930 B2
(45) Date of Patent: May 22, 2018

(54) HEAD-WEARABLE APPARATUS, 3D VIDEO CALL SYSTEM AND METHOD FOR IMPLEMENTING 3D VIDEO CALL

(71) Applicant: Beijing Pico Technology Co., Ltd., HaiDian District, Beijing (CN)

(72) Inventors: Xiangchen Yang, Beijing (CN); Ruisheng Zhang, Beijing (CN); Ligang Li, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/115,834

(22) PCT Filed: Jul. 18, 2016

(86) PCT No.: PCT/CN2016/090294
§ 371 (c)(1),
(2) Date: Aug. 1, 2016

(87) PCT Pub. No.: WO2017/092369
PCT Pub. Date: Jun. 8, 2017

(65) Prior Publication Data
US 2017/0163932 A1  Jun. 8, 2017

(30) Foreign Application Priority Data

Dec. 3, 2015 (CN) .................... 2015 2 0996561 U
Dec. 9, 2015 (CN) ......................... 2015 1 0907657

(51) Int. Cl.
H04N 7/15 (2006.01)
H04N 7/14 (2006.01)
H04N 13/02 (2006.01)
H04N 13/04 (2006.01)

(52) U.S. Cl.
CPC ......... *H04N 7/147* (2013.01); *H04N 13/0239* (2013.01); *H04N 13/0296* (2013.01); *H04N 13/044* (2013.01)

(58) Field of Classification Search
None
See application file for complete search history.

(56) References Cited

U.S. PATENT DOCUMENTS

2009/0102915 A1* 4/2009 Arsenich .................. G02B 5/10
   348/53
2010/0177168 A1* 7/2010 Hu ..................... H04N 13/0239
   348/47

(Continued)

FOREIGN PATENT DOCUMENTS

CN  103731659 A   4/2014
CN  104144335 A   11/2014

OTHER PUBLICATIONS

International Written Opinion issued in PCT/CN2016/090294 dated Oct. 9, 2016.

*Primary Examiner* — Creighton Smith
(74) *Attorney, Agent, or Firm* — Arent Fox LLP

(57) ABSTRACT

Embodiments of the present disclosure disclose a head-wearable apparatus, a 3D video call system and a method for implementing 3D video call. The present disclosure relates to virtual reality technologies and is invented to relatively completely shoot video images of the scenario where the user locates, achieve real-time 3D video call between users of both parties, and mutually share scenes viewed by themselves. The head-wearable apparatus comprises at least two cameras which are spaced apart from each other and arranged on the head fixing means and/or the video output unit, and field of vision of the at least two cameras superimposes and covers all positions in a horizontal direction. In a preferred embodiment, the head-wearable apparatus fur- (Continued)

ther comprises a video collecting unit which consists of two neighboring cameras, and the two neighboring cameras synchronously shoot the same scenario according to a distance between two pupils of human eyes to obtain left and right eye image data at different angles to synthesize a stereo image with a 3D effect.

17 Claims, 2 Drawing Sheets

(56) References Cited

U.S. PATENT DOCUMENTS

| | | | |
|---|---|---|---|
| 2011/0157313 A1* | 6/2011 | Chiang | H04N 13/0059 348/46 |
| 2011/0158637 A1* | 6/2011 | Jung | G03B 15/03 396/535 |
| 2011/0310230 A1* | 12/2011 | Cheng | H04N 13/0217 348/49 |
| 2013/0250040 A1* | 9/2013 | Vitsnudel | H04N 5/23238 348/36 |
| 2014/0064720 A1* | 3/2014 | Chapman | F16M 11/10 396/428 |
| 2014/0089962 A1* | 3/2014 | Ogawa | H04N 13/0051 725/29 |
| 2015/0195508 A1* | 7/2015 | Pavol | H04N 13/0239 348/46 |
| 2015/0258431 A1* | 9/2015 | Stafford | A63F 13/213 463/31 |
| 2015/0295610 A1* | 10/2015 | Li | H04B 1/38 455/456.3 |
| 2015/0362733 A1* | 12/2015 | Spivack | A63F 13/26 345/633 |
| 2016/0212356 A1* | 7/2016 | Wilkinson | H04N 5/272 |

* cited by examiner

HEAD-WEARABLE APPARATUS, 3D VIDEO CALL SYSTEM AND METHOD FOR IMPLEMENTING 3D VIDEO CALL

CROSS-REFERENCE TO RELATED APPLICATIONS

This application is a National Stage entry of International Application No. PCT/CN2016/090294, filed Jul. 18, 2016, which claims priority to Chinese Patent Application Nos. 201510907657.0, filed Dec. 9, 2015, and 201520996561.1, filed Dec. 3, 2015. The disclosure of the prior applications are hereby incorporated in their entirety by reference.

FIELD OF THE DISCLOSURE

The present disclosure relates to virtual reality technologies, and particularly to a head-wearable apparatus, a 3D video call system and a method for implementing 3D video call.

BACKGROUND OF THE DISCLOSURE

Virtual reality technology means generating a vivid virtual environment (e.g., aircraft cockpit, molecular structure world, and high-risk environment) in a specific range integrating the sense of vision, hearing and touch by employing computer technology as a core in combination with photoelectrical sensing technology. If a specific apparatus (action collection freedom space positioning, force feedback input, digital helmet, 3D display environment and the like) is used, a user may naturally perform real-time vivid interaction with an object in a virtual world so as to generate an immersive feeling and experience.

In recent years, as virtual reality technology gradually gets mature, various virtual reality apparatuses such as 3D scanners or head-mountable display devices gradually come into being. Using a virtual reality apparatus for social activities is one of hot uses of the virtual reality apparatus.

During social activities, partial users have a desire to exhibit their own environmental scenario to the other party to who they communicate with, for example, let friends have a look at duly-decorated new home or beautiful surrounding scenery, but current apparatus cannot meet the need well. Although some of apparatuses are mounted with a camera, usually only one camera is mounted and can only shoot partial scenario. If a user at a remote place desires to view the scenario where he himself locates, he can only follow the positions shot by the camera to view the scenario and cannot select a viewing position on his own as in a panoramic video.

In addition, as a mobile wideband network speed upgrades, various video application software arise gradually, wherein a long-distance communication device is used extensively. A basic principle of the long-distance communication device is collecting data via a camera and a microphone at one end, transmitting the data via a network transmitting module, and displaying images or broadcasting sound on a device at the other end. However, this type of long-distance communication device can only perform planar display and cannot present the scenes viewed by the transmitting end in a perfect 3D manner.

SUMMARY OF THE DISCLOSURE

In view of the above, embodiments of the present disclosure provide a head-wearable apparatus, a 3D video call system and a method for implementing 3D video call, which can relatively completely shoot video images of the scenario where the user locates, achieve real-time 3D video call between users of both parties, and share scenes viewed by themselves.

To achieve the above objective, embodiments of the present disclosure employ the following technical solutions:

In one aspect, embodiments of the present disclosure provide a head-wearable apparatus, comprising: a video output unit and a head fixing means; the video output unit is mounted on the head fixing means, the head-wearable apparatus further comprises at least two cameras which are spaced apart from each other and arranged on the head fixing means and/or the video output unit, and field of vision of the at least two cameras superimposes and covers all positions in a horizontal direction.

Optionally, the at least two cameras are disposed on the same circumference.

Optionally, the at least two cameras are equidistantly disposed on the same circumference.

Optionally, when the head-wearable apparatus is fixed on the user's head through the head fixing means, the at least two cameras are disposed on the same horizontal plane.

Optionally, the head fixing means comprises a first fixing member and a second fixing member;

Optionally, the first fixing member and second fixing member surround to form an annular space for fixing the user's head;

Optionally, the at least two cameras are disposed on the first fixing member and/or second fixing member, and shooting direction faces towards outside the first fixing member and/or second fixing member.

Optionally, the head-wearable apparatus further comprises a panoramic image stitching means connected with respective cameras.

Optionally, the head-wearable apparatus further comprises a video transmitting means connected with the panoramic image stitching means.

Optionally, the head-wearable apparatus further comprises an environment obstacle detecting means connected with respective cameras.

Optionally, the head-wearable apparatus further comprises an environment obstacle detecting means connected with the panoramic image stitching means.

Preferably, the head-wearable apparatus further comprises a video collecting unit which consists of two neighboring cameras, and the two neighboring cameras synchronously shoot the same scenario according to a distance between two pupils of human eyes to obtain left and right eye image data at different angles.

Further preferably, the head-wearable apparatus further comprises an audio collecting unit, an audio and video encoding unit, a central processing unit, an audio and video decoding unit and an audio output unit.

The audio collecting unit comprises at least one microphone for synchronously picking up audio data.

The audio and video encoding unit is configured to receive left and right eye image data collected by the video collecting unit and audio data synchronously picked up by the audio collecting unit, and encode the left and right eye image data and audio data into audio and video data and transmit them to the central processing unit.

The central processing unit is configured to receive the audio and video data transmitted by the audio and video encoding unit, and transmit the audio and video data to an opposing end; and to receive audio and video data transmitted from the opposing end and transmit the audio and video data transmitted from the opposing end to the audio and video decoding unit.

The audio and video decoding unit is configured to decode the audio and video data transmitted from the opposing end into corresponding left and right eye image data and audio data, and transmit the decoded left and right eye image data to the video output unit for 3D video display, and transmit the decoded audio data to the audio output unit for audio output.

Preferably, the video output unit comprises a left display screen for receiving a left eye image and a right display screen for receiving a right eye image, the left display screen is provided with a left optical system on a side adjacent to the human eye, the right display screen is provided with a right optical system on a side adjacent to the human eye, the left and right optical systems are used to enable left and right human eyes to synthesize a stereo image with a 3D effect upon seeing the left display screen and right display screen through corresponding optical systems.

Further preferably, the head-wearable apparatus further comprises an optical system control knob which is used to regulate a distance between a virtual screen formed by the left and right optical systems and human eyes, and control a display proportion of display content seen by human eyes.

Preferably, the head-wearable apparatus further comprises a camera distance regulating knob which is used to fine tune a horizontal distance between the two cameras.

Preferably, the head-wearable apparatus further comprises a camera angle regulating knob which is used to regulate an angle of each camera.

Preferably, the head-wearable apparatus further comprises an audio-video switching unit which is configured to, according to the user's instruction, switch the audio and video data transmitted by the central processing unit to the audio and video decoding unit into audio and video data collected by the local end, or restore it to audio and video data transmitted from the opposing end.

Preferably, the audio collecting unit comprises two or more microphones, and the central processing unit is further used to perform stereo processing for audio data picked up by the two or more microphones.

In another aspect, the present disclosure provides a 3D video call system which comprises a network server and at least two head-wearable apparatuses as stated in the previous technical solution;

Any two of the head-wearable apparatuses establish connection via the network server and achieve 3D video call via the network server.

In a further aspect, the present disclosure provides a method for implementing 3D video call by using the head-wearable apparatus provided by the above technical solution, the method comprising:

acquiring left and right eye image data at different angles as obtained by using two neighboring cameras on the head-wearable apparatus to synchronously shoot the same scenario according to a distance between two pupils of human eyes; obtaining audio data synchronously picked up by at least one microphone on the head-wearable apparatus;

encoding the left and right eye image data and audio data into audio and video data;

transmitting the audio and video data to an opposing end, and receiving audio and video data transmitted from the opposing end;

decoding the audio and video data transmitted from the opposing end into corresponding left and right eye image data and audio data, and transmitting the decoded left and right eye image data to the video output unit for 3D video display, and transmitting the decoded audio data to the audio output unit for audio output.

Preferably, transmitting the decoded left and right eye image data to the video output unit for 3D video display comprises:

using a left display screen to receive a left eye image and using a right display screen to receive a right eye image;

synthesizing images displayed by left and right display screens into a stereo image with a 3D effect by using a left optical system disposed on a side of the left display screen adjacent to the human eye and a right optical system disposed on a side of the right display screen adjacent to the human eye.

Advantageous effects of embodiments of the present disclosure are as follows: one the one hand, since the head-wearable apparatus according to embodiments of the present disclosure comprises at least two cameras which are spaced apart from each other and arranged on the head fixing means and/or the video output unit, video image of a scenario where the user locates can be shot relatively completely from more positions. On the other hand, according to the 3D video call system and the method for implementing 3D video call according to embodiments of the present disclosure, a procedure of human eyes observing scenery is simulated, two neighboring cameras constitute the video collecting unit of the head-wearable apparatus, the two neighboring cameras are used to collect image data of left and right eyes with left and right eye parallax, the audio collecting unit of the head-wearable apparatus is used to synchronously pick up audio data, the image data of left and right eyes and the audio data simultaneously picked up, after being encoded, are transmitted to the head-wearable apparatus at the opposing end for 3D display, meanwhile audio and video data transmitted from the opposing end is received, after being decoded, obtained left and right eye image data is transmitted to the video output unit of the local end for 3D video display, and the obtained audio data is transmitted to the audio output unit of the local end for audio output, thereby implementing real-time 3D video call between the users at both parties and mutual sharing of scenery viewed by themselves.

BRIEF DESCRIPTION OF DRAWINGS

To make technical solutions in embodiments of the present disclosure or the prior art apparent, figures used in the embodiments or the prior art are briefly described below. Obviously, the figures described below are only some embodiments of the present disclosure. Those having ordinary skill in the art can obtain other figures according to these figures without making inventive efforts.

DETAILED DESCRIPTION OF PREFERRED EMBODIMENTS

To make objectives, technical solutions and advantages of the present disclosure clearer, embodiments of the present disclosure will be described in more detail with reference to figures.

It should be appreciated that the described embodiments are only partial embodiments of the present disclosure, not all embodiments. Based on the embodiments in the present disclosure, all other embodiments obtained by those having ordinary skills in the art without making creative efforts fall within the protection scope of the present disclosure.

Figure 1:
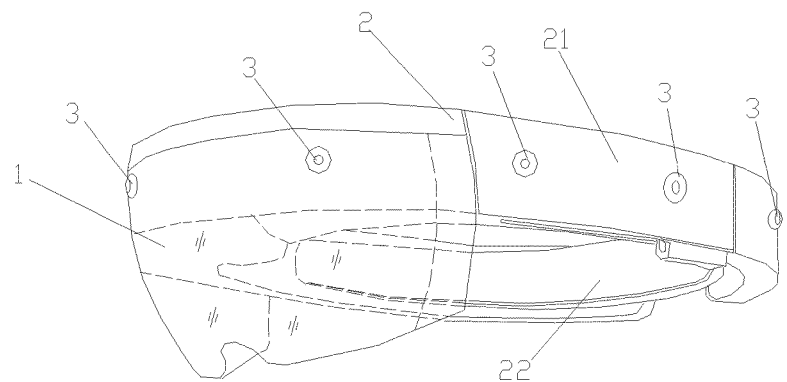
FIG. 1 is a structural schematic view of a head-wearable apparatus according to an embodiment of the present disclosure.

Referring to FIG. 1, a head-wearable apparatus according to an embodiment of the present disclosure comprises a video output unit 1 and a head fixing means 2; the video output unit 1 is mounted on the head fixing means 2. The head-wearable apparatus further comprises at least two cameras 3 which are spaced apart from each other and arranged on the head fixing means 2 and/or the video output unit 1.

Since the head-wearable apparatus according to the embodiment of the present disclosure comprises at least two cameras which are spaced apart from each other and arranged on the head fixing means and/or the video output unit, video image of a scenario where the user locates can be shot relatively completely from more positions.

In the aforesaid embodiment of the head-wearable apparatus, the video output unit 1 may employ a video output unit in a current head-wearable apparatus, for example, it may include a relevant display element, optical element and the like.

In the aforesaid embodiment of the head-wearable apparatus, the head fixing means 2 comprises a first fixing member 21 and a second fixing member 22; the first fixing member and second fixing member surround to form an annular space for fixing the user's head; the at least two cameras 3 are disposed on the first fixing member 21 and/or second fixing member 22, and shooting direction faces towards outside of the first fixing member and/or second fixing member.

In the aforesaid embodiment of the head-wearable apparatus, the respective cameras 3 may employ the cameras in the prior art. The number of the cameras may be determined according to a shooting scope of a single camera, namely, a magnitude of field of vision (FOV), for example, if the field of vision of the camera is large, a spacing between cameras may be magnified. If a panoramic video image of the scenario where the head-wearable apparatus locates needs to be obtained and the FOV of the cameras may reach 180 degrees, only two cameras need to be mounted at positions spaced apart by an angle of 180 degrees.

Preferably, scenarios shot by the arranged respective cameras are combined together to obtain the panoramic video image of the scenario where the head-wearable apparatus locates.

Figure 2:
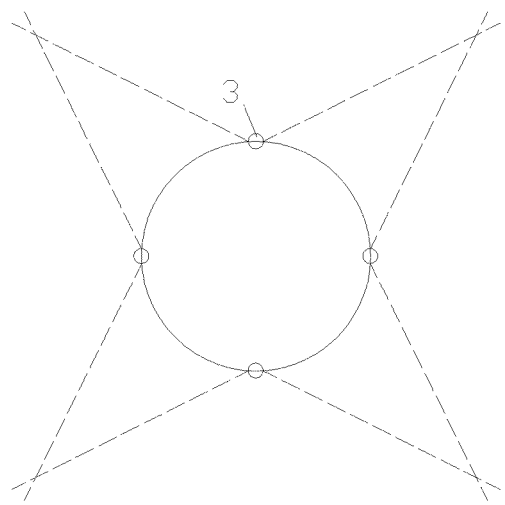
FIG. 2 is a schematic view showing arrangement of cameras in the head-wearable apparatus according to an embodiment of the present disclosure.

Referring to FIG. 2, as a preferred embodiment, the number of cameras is four, and shooting scopes of neighboring cameras are accurately connected or partially overlap.

In the aforesaid embodiment of the head-wearable apparatus, the at least two cameras are disposed on the same circumference. Preferably, the at least two cameras are equidistantly disposed on the same circumference.

To obtain an immersive scenario video image, when the head-wearable apparatus is fixed on the user's head through the head fixing means, the at least two cameras are disposed on the same horizontal plane.

To obtain a complete scenario video image, the head-wearable apparatus may further comprise a panoramic image stitching means connected with respective cameras. Image stitching is a technology of using real world images to form a panoramic space, and according to this technology, multiple images are stitched into a large-scale image or a 360-degree panoramic image. Image stitching technology relates to technologies such as computer vision, computer graphics, digital image processing and some mathematical tools. Basic steps of image stitching mainly comprises the following aspects: computer calibration, sensor image distortion correction, image projection transformation, selection of matching points, panoramic image stitching (fusion), and brightness and color balance processing and the like. Image stitching technology belongs to the prior art and will not be detailed here.

To facilitate sharing the panoramic video obtained by the panoramic image stitching means with other users, the head-wearable apparatus may further comprise a video transmitting means connected with the panoramic image stitching means. As such, the video can be easily transmitted to other users at remote places for viewing.

To assist in detecting whether there is an obstacle in an ambient environment to thereby remind the user to avoid danger, the head-wearable apparatus may further comprise an environment obstacle detecting means connected with respective cameras, wherein a prior art technology may be employed to perform obstacle detection through images.

As an optional embodiment, the environment obstacle detecting means may also be connected with the panoramic image stitching means. As such, it is feasible to locally detect an obstacle in the surrounding through images of the surrounding scenario from the obtained real-time panoramic video of the scenario where the user locates.

Since there is about 6 cm horizontal distance between two human eyes, scenes viewed by two eyes certainly have an angular difference when the two eyes view an object in the front, and this difference enables the brain to automatically form an up-down, left-right, and front-rear difference and thereby generate a 3D vision. The present disclosure simulates a procedure of human eyes observing scenery. Two neighboring cameras in the aforesaid head-wearable apparatus are selected to constitute a video collecting unit. The two neighboring cameras are used to collect image data with left and right eye parallax, and transmit the image data to the video output unit of the head-wearable apparatus for 3D display.

Embodiment 1

Figure 3:
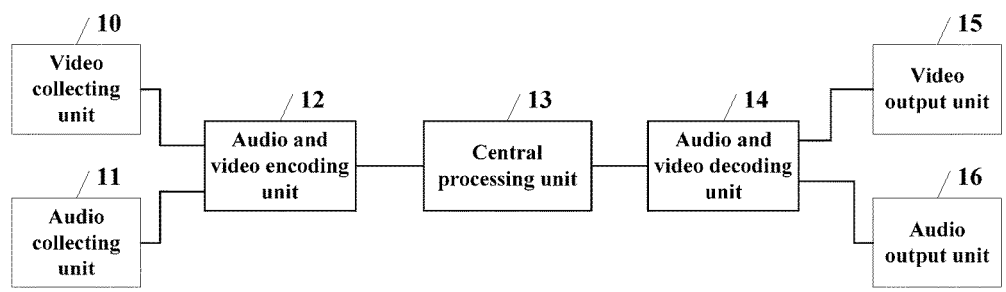
FIG. 3 is a schematic view of components of a head-wearable apparatus according to Embodiment 1 of the present disclosure.

FIG. 3 is a schematic view of components of a head-wearable apparatus according to an embodiment of the present disclosure. The head-wearable apparatus in FIG. 3 comprises: a video collecting unit 10, an audio collecting unit 11, an audio and video encoding unit 12, a central processing unit 13, an audio and video decoding unit 14, a video output unit 15 and an audio output unit 16.

The video collecting unit 10 consists of two neighboring cameras, and the two neighboring cameras synchronously shoot the same scenario according to a distance between two pupils of human eyes to obtain left and right eye image data at different angles.

The audio collecting unit 11 comprises at least one microphone for synchronously picking up audio data.

The audio and video encoding unit 12 is configured to receive the left and right eye image data collected by the video collecting unit 10 and audio data synchronously picked up by the audio collecting unit 11, and encode the left and right eye image data and audio data into audio and video data and transmit them to the central processing unit 13.

The central processing unit 13 is configured to receive the audio and video data transmitted by the audio and video encoding unit 12, and transmit the audio and video data to an opposing end; and to receive audio and video data transmitted from the opposing end and transmit the audio and video data transmitted by the end to the audio and video decoding unit 14. Specifically, the central processing unit 13 comprises a network transmission module which is used to transmit the audio and video data transmitted by the audio and video encoding unit 12 to the opposing end and used to receive the encoded audio and video data transmitted from the opposing end.

The audio and video decoding unit 14 is configured to decode the audio and video data transmitted from the opposing end into corresponding left and right eye image data and audio data, and transmit the decoded left and right eye image data to the video output unit 15 for 3D video display, and transmit the decoded audio data to the audio output unit 16 for audio output.

The head-wearable apparatus according to the embodiment implements both parties' real-time 3D video call and mutual sharing of scenery viewed by both parties by using the video collecting unit constituted by two neighboring cameras and by transmitting the image data collected by the two neighboring cameras and the audio data synchronously collected by the audio collecting unit to the opposing end via a network.

In a specific implementation solution of the present embodiment, the video output unit 15 comprises a left display screen for receiving a left eye image and a right display screen for receiving a right eye image, the left display screen is provided with a left optical system on a side adjacent to the human eye, the right display screen is provided with a right optical system on a side adjacent to the human eye, the left and right optical systems are used to enable left and right human eyes to synthesize a stereo image with a 3D effect upon seeing the left display screen and right display screen through corresponding optical systems.

In this specific implementation solution, the head-wearable apparatus further comprises an optical system control knob which is used to regulate a distance between a virtual screen formed by the left and right optical systems and human eyes, and control a display proportion of display content seen by human eyes. For example, when the virtual screen formed by the left and right optical systems and human eyes are located at positions with a maximum distance therebetween, the video output unit at the local end is set to display the video content transmitted from the user at the opposing end at an equal proportion; when the user desires to more clearly view a certain object in an image, the distance between the virtual screen formed by the left and right optical systems and human eyes is pulled nearer based on the principle that the object seems bigger as viewed at a near distance and smaller as viewed at a far distance.

In another specific implementation solution of the present embodiment, the head-wearable apparatus further comprises an audio-video switching unit which is configured to, according to the user's instruction, switch the audio and video data transmitted by the central processing unit to the audio and video decoding unit into audio and video data collected by the local end, or restore it to audio and video data transmitted from the opposing end. With the audio-video switching unit being added, the user may be enabled to look up content shot by himself and view the same content as viewed by the user at the opposing end.

Noticeably, due to individual difference, the head-wearable apparatus according to the present embodiment further comprises a camera distance regulating knob and a camera angle regulating knob, wherein the camera distance regulating knob is used to fine tune a horizontal distance between two cameras to adapt for pupil distances of different users, avoid ghosting and improve visual effects. The camera angle regulating knob is used to regulate an angle of each camera to meet the user's needs of shooting the scenery from different angles.

To further improve the visual effects, preferably the audio collecting unit 11 comprises two or more microphones in the present embodiment. When the audio collecting unit 11 comprises two or more microphones, the central processing unit 13 is further used to perform stereo processing for audio data picked up by two or more microphones.

Embodiment 2

The present embodiment is based on the same technical idea as Embodiment 1 and provides a 3D video call system.

Figure 4:
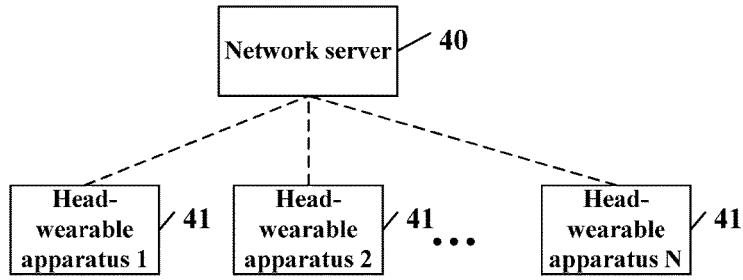
FIG. 4 is a schematic view of components of a 3D video call system according to Embodiment 2 of the present disclosure.

FIG. 4 is a schematic view of components of a 3D video call system according to the present embodiment. The 3D video call system in FIG. 4 comprises a network server 40 and at least two head-wearable apparatuses 41 as stated in the previous embodiment;

Any two head-wearable apparatuses 41 establish connection via the network server 40 and achieve 3D video call via the network server 40.

The present embodiment uses the network server to establish connection between the head-wearable apparatuses, achieves data transmission between head-wearable apparatuses via the network server, and implements real-time 3D video call between head-wearable apparatuses and mutual sharing of scenery viewed by themselves.

Embodiment 3

Figure 5:
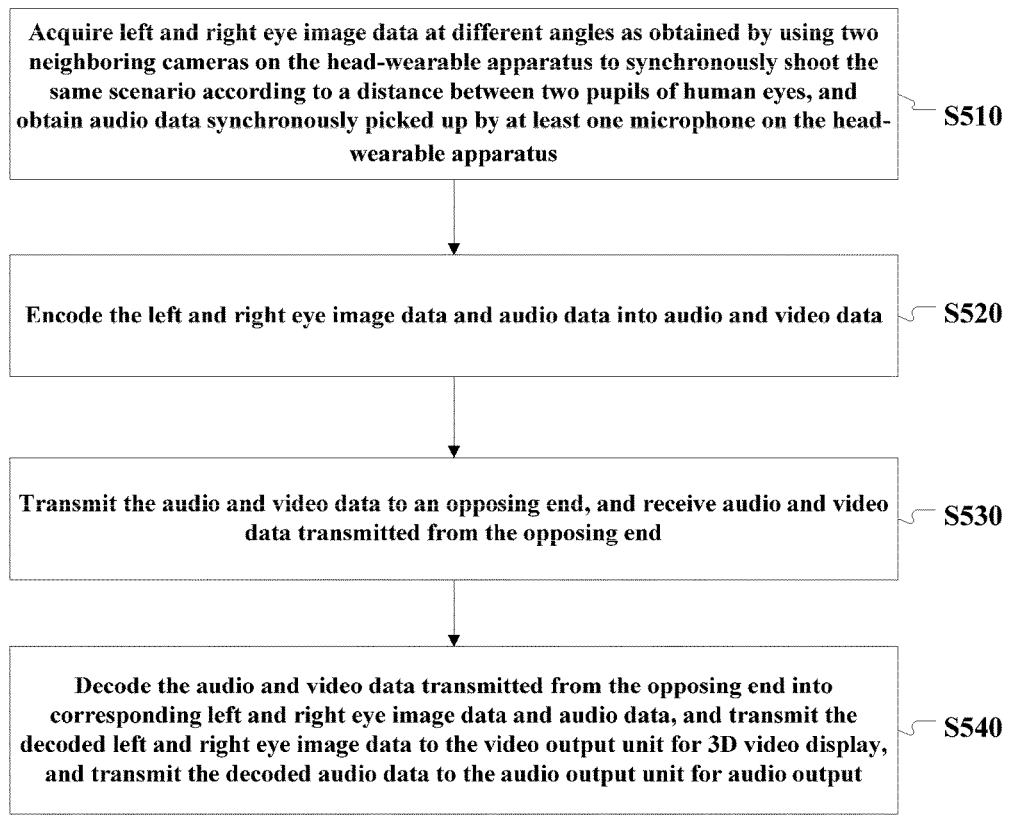
FIG. 5 is a flow chart of a method for implementing 3D video call according to Embodiment 3 of the present disclosure.

The present embodiment is based on the same technical idea as Embodiment 1 and provides a method for implementing 3D video call by using the head-wearable apparatus according to the above Embodiment 1. FIG. 5 is a flow chart of a method for implementing 3D video call according to the present embodiment. As shown in FIG. 5, the method according to Embodiment 3 comprises:

S510: acquiring left and right eye image data at different angles as obtained by using two neighboring cameras on the head-wearable apparatus to synchronously shoot the same scenario according to a distance between two pupils of human eyes, and obtaining audio data synchronously picked up by at least one microphone on the head-wearable apparatus.

In practical application, before two neighboring cameras are used to synchronously shoot the same scenario according to the distance between two pupils of human eyes, a horizontal distance between two cameras is fine tuned to adapt for pupil distances of different users.

S520: encoding the left and right eye image data and audio data into audio and video data.

S530: transmitting the audio and video data to an opposing end, and receiving audio and video data sent from the opposing end.

S540: decoding the audio and video data transmitted from the opposing end into corresponding left and right eye image data and audio data, and transmitting the decoded left and right eye image data to the video output unit for 3D video display, and transmitting the decoded audio data to the audio output unit for audio output.

In this step, transmitting the decoded left and right eye image data to the video output unit for 3D video display comprises:

using a left display screen to receive a left eye image and using a right display screen to receive a right eye image;

synthesizing images displayed by left and right display screens into a stereo image with a 3D effect by using a left optical system disposed on a side of the left display screen adjacent to the human eye and a right optical system disposed on a side of the right display screen adjacent to the human eye.

Furthermore, the above solution further comprises: regulating a distance between a virtual screen formed by the left and right optical systems and human eyes, and controlling display content seen by human eyes and a display proportion of the display content, and, according to the user's instruction, switching the audio and video data source into audio and video data collected by the local end, or restore it to audio and video data transmitted from the opposing end.

Reference may be made to specific content of the embodiments of the head-wearable apparatus according to the present disclosure for specific manners for executing steps in the embodiment of the method according to the present disclosure.

To conclude, one the one hand, since the head-wearable apparatus according to embodiments of the present disclosure comprises at least two cameras which are spaced apart from each other and arranged on the head fixing means and/or the video output unit, video image of a scenario where the user locates can be shot relatively completely from more positions. On the other hand, according to the 3D video call system and the method for implementing 3D video call according to embodiments of the present disclosure, a procedure of human eyes observing scenery is simulated, two neighboring cameras constitute the video collecting unit of the head-wearable apparatus, the two neighboring cameras are used to collect image data of left and right eyes with left and right eye parallax, the audio collecting unit of the head-wearable apparatus is used to synchronously pick up audio data, the image data of left and right eyes and the audio data simultaneously picked up are, after being encoded, transmitted to the head-wearable apparatus at the opposing end for 3D display, meanwhile audio and video data transmitted from the opposing end is received, after being decoded, obtained left and right eye image data is transmitted to the video output unit of the local end for 3D video display, and the obtained audio data is transmitted to the audio output unit of the local end for audio output, thereby implementing real-time 3D video call between the users at both parties and mutual sharing of scenery viewed by themselves.

What are described above are only specific embodiments of the present disclosure, but the protection scope of the present disclosure is not limited to this, and any variations and substitutions readily envisaged by those skilled in the art within the technical scope revealed by the present disclosure all fall within the protection scope of the present disclosure. Hence, the protection scope of the present invention should be subject to the protection scope as defined by the appended claims.

What is claimed is:

1. A head-wearable apparatus, comprising a video output unit and a head fixing means, the video output unit being mounted on the head fixing means, wherein
   the head-wearable apparatus further comprises at least four cameras, at least two cameras in the at least four cameras are spaced apart from each other and arranged on the head fixing means, at least two cameras in the at least four cameras are spaced apart from each other and arranged on the video output unit;
   the head fixing means surrounds to form an annular space for fixing a user's head;
   shooting directions of the at least two cameras on the head fixing means face towards outside of the head fixing means;
   fields of vision of the at least four cameras superimpose and cover all positions in a horizontal direction;
   the at least four cameras consist a video collecting unit which synchronously shoots the same scenario according to a distance between two pupils of human eyes to obtain left and right eye image data at different angles;
   the head-wearable apparatus further comprises an audio collecting unit, an audio and video encoding unit, a central processing unit, an audio and video decoding unit and an audio output unit;
   the audio collecting unit comprises at least one microphone for synchronously picking up audio data;
   the audio and video encoding unit is configured to receive left and right eye image data collected by the video collecting unit and audio data synchronously picked up by the audio collecting unit, and encode the left and right eye image data and audio data into audio and video data and transmit them to the central processing unit;
   the central processing unit is configured to receive the audio and video data transmitted by the audio and video encoding unit, and transmit the audio and video data to an opposing end; and to receive audio and video data transmitted from the opposing end and transmit the audio and video data transmitted from the opposing end to the audio and video decoding unit;
   the audio and video decoding unit is configured to decode the audio and video data transmitted from the opposing end into corresponding left and right eye image data and audio data, and transmit the decoded left and right eye image data to the video output unit for 3D video display, and transmit the decoded audio data to the audio output unit for audio output;
   an audio-video switching unit is configured to, according to a user's instruction, either switch the audio and video data which is transmitted to the audio and video decoding unit by the central processing unit into audio and video data collected by a local end, or restore the audio and video data which is transmitted to the audio and video decoding unit by the central processing unit into audio and video data transmitted from the opposing end.

2. The head-wearable apparatus according to claim 1, wherein the at least four cameras are disposed on a same circumference.

3. The head-wearable apparatus according to claim 2, wherein the at least four cameras are equidistantly disposed on a same circumference.

4. The head-wearable apparatus according to claim 3, wherein when the head-wearable apparatus is fixed on a user's head through the head fixing means, the at least four cameras are disposed on a same horizontal plane.

5. The head-wearable apparatus according to claim 1, wherein the head fixing means comprises a first fixing member and a second fixing member.

6. The head-wearable apparatus according to claim 1, wherein the head-wearable apparatus further comprises comprise a panoramic image stitching means connected with respective cameras.

7. The head-wearable apparatus according to claim 6, wherein the head-wearable apparatus further comprises a video transmitting means connected with the panoramic image stitching means.

8. The head-wearable apparatus according to claim 1, wherein the head-wearable apparatus further comprises an environment obstacle detecting means connected with respective cameras.

9. The head-wearable apparatus according to claim 6, wherein the head-wearable apparatus further comprises an environment obstacle detecting means connected with the panoramic image stitching means.

10. The head-wearable apparatus according to claim 1, wherein the video output unit comprises a left display screen for receiving a left eye image and a right display screen for receiving a right eye image, the left display screen is provided with a left optical system on a side adjacent to a human eye, the right display screen is provided with a right optical system on a side adjacent to the human eye, the left and right optical systems are used to enable left and right eyes to synthesize a stereo image with a 3D effect upon seeing the left display screen and right display screen through corresponding optical systems.

11. The head-wearable apparatus according to claim 10, wherein the head-wearable apparatus further comprises an optical system control knob which is used to regulate a distance between a virtual screen formed by the left and right optical systems and human eyes, and control a display proportion of display content seen by human eyes.

12. The head-wearable apparatus according to claim 1, wherein the head-wearable apparatus further comprises a camera distance regulating knob which is used to fine tune a horizontal distance between the each two neighboring cameras.

13. The head-wearable apparatus according to claim 1, wherein the audio collecting unit comprises two or more microphones, and the central processing unit is further used to perform stereo processing for audio data picked up by the two or more microphones.

14. A 3D video call system, wherein the 3D video call system comprises a network server and at least two head-wearable apparatuses according to claim 1; any two of the head-wearable apparatuses establish connection via the network server and achieve 3D video call via the network server.

15. A method for implementing 3D video call by using the head-wearable apparatus according to claim 1, the method comprising:
    acquiring the left and right eye image data at different angles as obtained by using the each two neighboring cameras on the head-wearable apparatus to synchronously shoot the same scenario according to the distance between the two pupils of human eyes; obtaining the audio data synchronously picked up by the at least one microphone on the head-wearable apparatus;
    encoding the left and right eye image data and the audio data into the audio and video data;
    transmitting the audio and video data to the opposing end, and receiving the audio and video data transmitted from the opposing end;
    decoding the audio and video data transmitted from the opposing end into corresponding left and right eye image data and audio data, and transmitting the decoded left and right eye image data to the video output unit for 3D video display, and transmitting the decoded audio data to the audio output unit for audio output.

16. The method according to claim 15, wherein the transmitting the decoded left and right eye image data to the video output unit for 3D video display comprises:
    using a left display screen to receive a left eye image and using a right display screen to receive a right eye image;
    synthesizing images displayed by left and right display screens into a stereo image with a 3D effect by using a left optical system disposed on a side of the left display screen adjacent to the human eye and a right optical system disposed on a side of the right display screen adjacent to the human eye.

17. The head-wearable apparatus according to claim 1, wherein the head-wearable apparatus further comprises a camera angle regulating knob which is used to regulate an angle of each camera.

* * * * *